No. 739,833. PATENTED SEPT. 29, 1903.
F. A. COLWELL.
BAND CUTTER AND FEEDER FOR THRESHING MACHINES.
APPLICATION FILED NOV. 6, 1902.
NO MODEL. 3 SHEETS—SHEET 3.
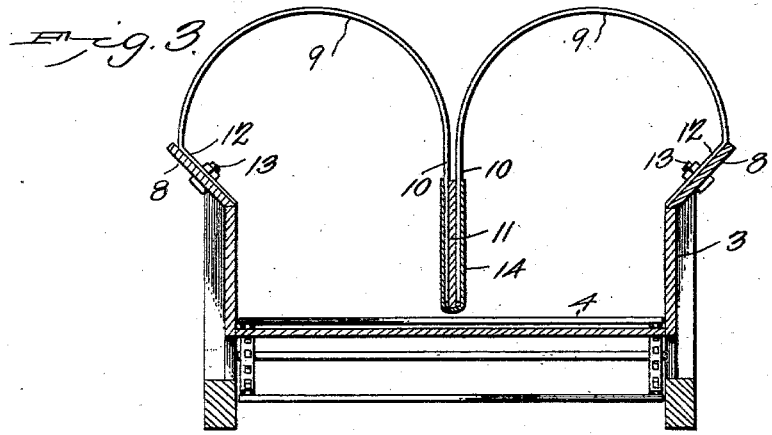
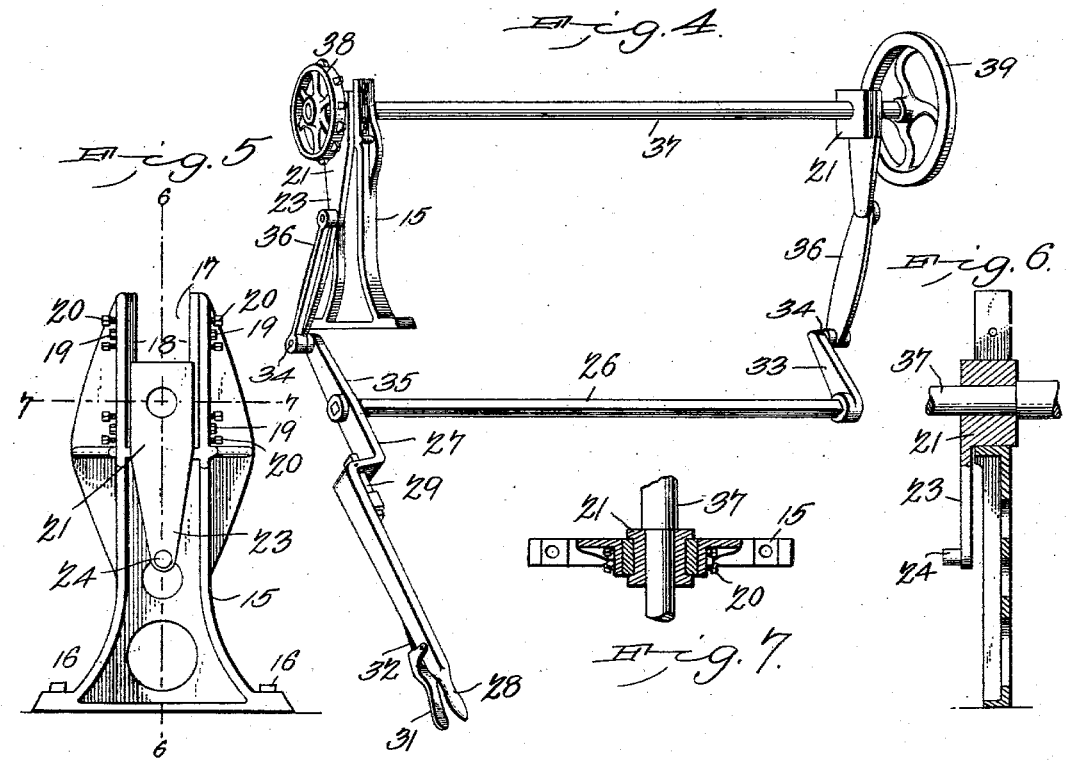

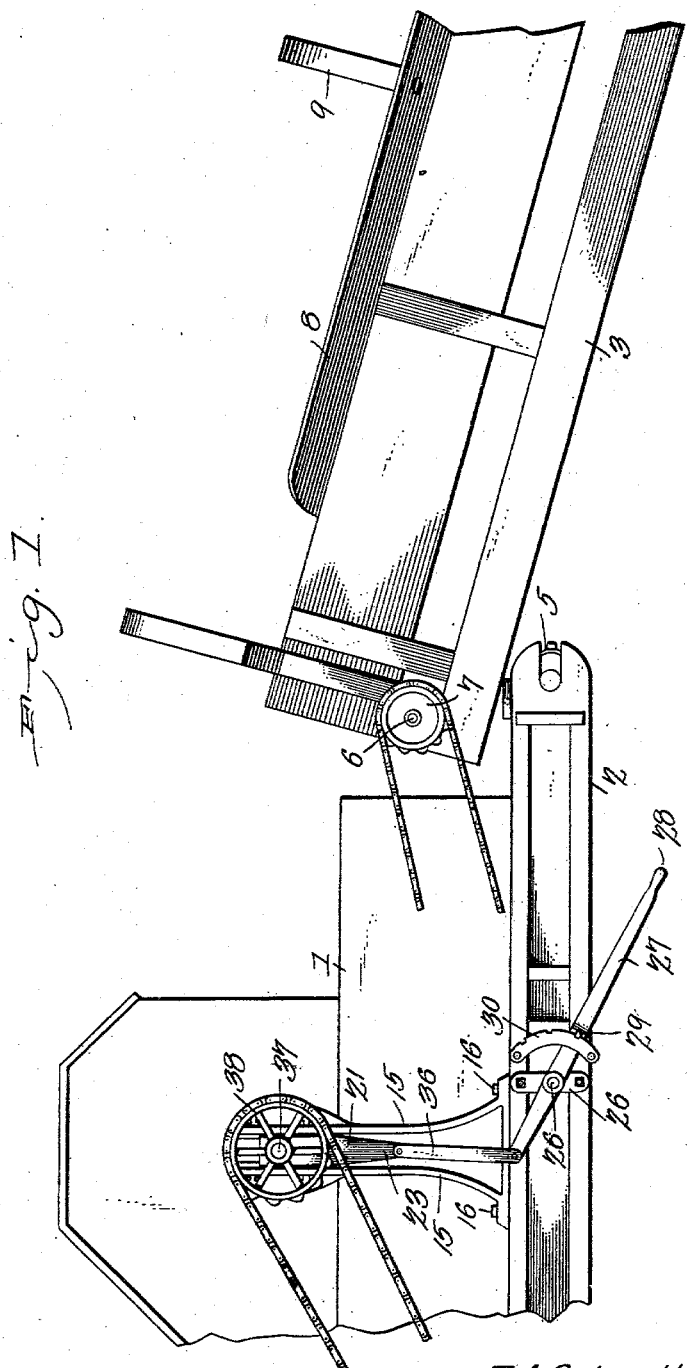

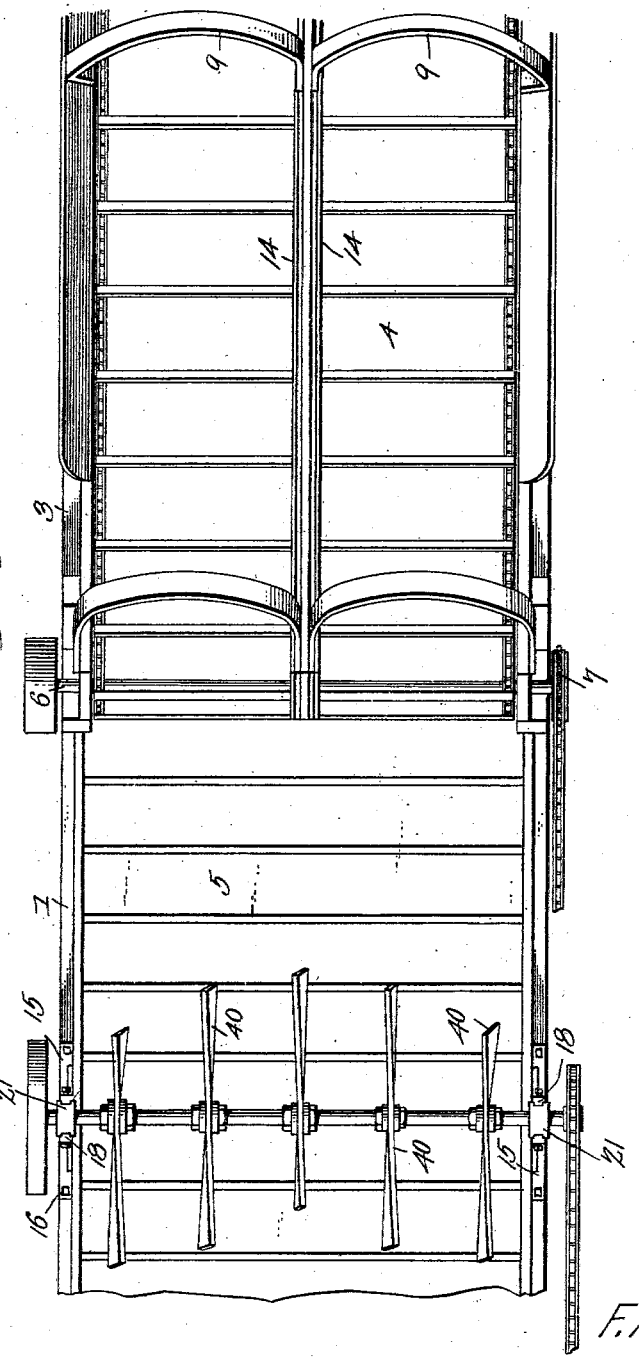

No. 739,833. Patented September 29, 1903.

UNITED STATES PATENT OFFICE.

FRANK A. COLWELL, OF OAKESDALE, WASHINGTON.

BAND-CUTTER AND FEEDER FOR THRESHING-MACHINES.

SPECIFICATION forming part of Letters Patent No. 739,833, dated September 29, 1903.

Application filed November 6, 1902. Serial No. 130,297. (No model.)

*To all whom it may concern:*

Be it known that I, FRANK A. COLWELL, a citizen of the United States, residing at Oakesdale, in the county of Whitman and State of Washington, have invented a new and useful Band-Cutter and Feeder for Threshing-Machines, of which the following is a specification.

This invention relates to an improved band-cutting and feeding attachment for threshing-machines; and it has for its object to provide a device of this class which shall be specially applicable and adapted to be used in connection with such threshing-machines as are specially constructed and adapted for the purpose of threshing loose or headed grain, the purpose of my invention being to provide an attachment comprising a band-cutting apparatus and an addition to the feeder whereby bound grain may be properly fed and the bands cut prior to the delivery of the grain to the threshing mechanism.

With these ends in view my invention consists in the improved construction, arrangement, and combination of parts which will be hereinafter fully described, and particularly pointed out in the claims.

In the accompanying drawings, Figure 1 is a side view of a portion of the casing of a threshing-machine and feeder having my improvement applied thereto. Fig. 2 is a plan view of the same. Fig. 3 is a transverse sectional view taken on the line 3 3 in Fig. 2. Fig. 4 is a perspective detail view showing the shaft of the band-cutter and the supporting and adjusting mechanism for the same detached from the machine, but with the several parts in their related position, with the exception of one of the supporting-standards. Fig. 5 is a side view, on an enlarged scale, of one of the supporting-standards. Fig. 6 is a vertical sectional view taken on the line 6 6 in Fig. 5. Fig. 7 is a transverse sectional view taken on the line 7 7 in Fig. 5.

Corresponding parts in the several figures are indicated by similar numerals of reference.

1 designates a portion of the casing at the front end of a threshing-machine having sills 2, which are extended to support the upper end of the carrier trough or frame 3, in which a slatted endless carrier 4 of suitable construction operates to convey the grain to the horizontal slatted carrier 5, which operates between the sills 2 and which serves to convey the grain to the threshing mechanism, comprising the ordinary cylinder and concave, which do not appear in the drawings. The endless carrier 4 is driven by a shaft 6, carrying a sprocket-wheel 7, which receives motion from the source of power. The carrier trough or frame 3 is provided at the upper edges of the sides thereof with outwardly-extending inclined flanges 8.

9 9 represent bows or arches constructed, preferably, of strap-iron and having pendent inner ends 10, between which is secured a longitudinal dividing-board 11. The outer ends of the arches 9 are bent obliquely in an inward direction to form brackets 12, adapted to rest and be supported upon the inclined flanges or side boards 8, where they may be secured by means of bolts or screws 13 or in any other suitable and convenient manner. The longitudinal dividing-board 11 is to be provided with two or more pairs of such arches, which will thus when placed in position serve to support the said dividing-board longitudinally in the trough of the carrier a sufficient distance above the latter to prevent its operation from being interfered with by the said dividing-board.

14 designates a protective covering of sheet metal, U-shaped in cross-section, which is secured exteriorly to the longitudinal dividing-board and which forms a covering for the latter and for the pendent ends 10 of the arches at their points of attachment. The purpose of this covering is to prevent the edges of the arches from catching and interfering with the feed of the grain-bundles that are being conveyed by the carrier to the band-cutting mechanism, which is to be presently described. It will be observed that the addition of the inclined flanges 8 to the sides of the carrier-trough enables me to make the arches 9 of a sufficient width so that interference of the same with the bundles of grain that are being conveyed over the carrier shall be rendered practically impossible. This construction, in connection with the use of the protective covering-plate 14, enables me to feed sheaves or bundles of grain as easily and effectively as the loose grain for which the carrier is originally intended.

Between the sills 2 2 of the machine is located the horizontal feed-table, having the slatted carrier 5, which receives the grain from the carrier 4 and conveys it to the threshing mechanism. This carrier 5 is constructed and operated in the usual manner. The sills 2 are adapted to support a pair of standards or uprights 15, one at each side of the machine. These standards or uprights are castings designed with a view to combine strength with lightness and neatness of appearance, and they are provided at their lower ends with openings to receive stub-bolts 16 or other suitable means whereby they may be attached to the sills of the machine. The upper ends of the standards are provided with vertical slots 17, having flanges 18 upon their inner sides, said flanges constituting wear-plates, constructed, preferably, of wrought-iron and mounted by means of supporting-screws 19 and adjusting-screws 20 at their upper and lower ends, so as to be capable of proper adjustment to compensate for wear upon the boxes 21, which are mounted slidingly in the slots 17 between the wear-plates 18 and are provided with vertical grooves 22, engaging the latter. The boxes 21 are provided with downwardly-extending arms or brackets 23, the lower ends of which are provided with pins or studs 24.

The sides of the casing of the threshing-machine or of the sills 2 are provided with bearing-plates 25, suitably attached thereto and affording bearings for the shaft 26, which extends transversely through the machine below or between the upper and lower leads of the endless carrier 5. Securely mounted upon one of the projecting ends of said shaft is a lever 27, the long end or arm of which forms a handle 28, which is equipped with a suitably-constructed dog or catch 29, adapted to engage a rack-segment 30, secured upon the frame of the machine adjacent thereto for the purpose of retaining the said lever at any desired point of adjustment, the dog or catch being operated by means of a handle 31 and a connecting-rod 32. The opposite projecting end of the shaft 26 carries a crank 33, which is equal in length to the short end of the lever 27 and which, like the latter, is provided with a laterally-extending wrist-pin or stud 34. The short end of the lever, which is designated 35, and the crank 33 are connected with the vertically-slidable boxes 21 by means of links 36, having perforations whereby they engage the pins 24 upon the brackets 23 of the said boxes and the wrist-pins 34 at the ends of the cranks 33 and 35, the term "crank" being properly applied to the short end or arm of the lever, as will be readily understood.

The boxes 21 support bearings for the transverse shaft 37, one end of which carries a sprocket-wheel 38, through which it receives motion by means of a chain connecting it with the source of power. The opposite end of the shaft has a balance-wheel 39 to insure steadiness of motion. The shaft 37 carries a plurality of band-cutting knives 40, which may be mounted upon said shaft in any suitable manner. These knives, as will be seen clearly in Fig. 2 of the drawings, are twisted obliquely of their lengths, this being done for the double purpose of imparting to their cutting edges a sweeping or inclined movement with relation to the material operated upon, but especially for the purpose of assisting in spreading or scattering the grain laterally as soon as the bands are cut, thereby enabling it to be more readily operated upon by the carrier 5, whereby it is fed into the throat of the machine.

It will be observed that by manipulating the lever 27 the shaft 37, carrying the band-cutting knives, may be raised or lowered to any extent within the limit of the slots 17 and that it may be retained securely at any desired adjustment by means of the catch 29 engaging the rack 30. This adjustment is found to be of great importance, inasmuch as the bundles that are to be operated upon are oftentimes of greatly-varying dimensions, and it is of the greatest importance in order to insure the maximum of efficiency in operation that the band-cutters should be capable not only of proper adjustment, but also of an adjustment which may be speedily—in fact, almost instantaneously—effected. This is true of my improved attachment, in which by a simple movement of the lever the shaft 37 may be instantaneously adjusted with the utmost degree of accuracy, which, as will be readily understood, is necessary to the free and successful operation of the parts.

It oftentimes happens in sections of the country where grain is usually headed and where threshing-machines for the purpose of dealing with headed grain are mostly employed that the threshers come across grain in bundles which, not being prepared therefor, they find it difficult to handle. My improved attachment, which may be described as consisting simply of the band-cutting attachment and the longitudinal dividing-board to be connected with the main feed-trough, is sufficiently light and convenient to handle to be easily carried along with a threshing outfit, and whenever needed it may in a very short time be placed in position for operation, as will be readily understood. Being neither heavy nor cumbersome, it may be readily carried as a part of the threshing outfit.

I desire it to be understood that while I have in the foregoing described the preferred form of my invention I do not necessarily limit myself with regard to the details of the same, but reserve the right to any changes, alterations, and modifications which may be resorted to without departing from the spirit of my invention or sacrificing the utility of the same.

Having thus described my invention, what I claim is—

1. The combination of a carrier-trough having side walls, arches supported from said side walls, a longitudinal partition or dividing-board supported by the inner ends of said arches, and a sheet of metal, covering the surface of said partition and also the attached ends of said arches and presenting a smooth unobstructed surface to the advance of the grain.

2. The combination of a carrier-trough having side walls provided with outstanding flanges, a carrier in said trough, a longitudinal dividing-board, arches supporting said dividing-board at their inner pendent ends, said arches being swelled outwardly to the outer edges of the outstanding flanges of the side walls of the carrier-trough and provided with inturned ends supported upon said flanges, and a U-shaped protective covering-plate embracing the sides and bottom edge of the dividing-board, and also the attached ends of the arches, and presenting a smooth unobstructed surface to the advance of the grain.

In testimony that I claim the foregoing as my own I have hereto affixed my signature in the presence of two witnesses.

FRANK A. COLWELL.

Witnesses:
DAN. MORGAN,
A. M. BAKER.